(12) United States Patent
Uchiyama et al.

(10) Patent No.: US 7,357,313 B2
(45) Date of Patent: Apr. 15, 2008

(54) INFORMATION PROCESSOR-BASED SERVICE PROVIDING SYSTEM AND METHOD

(75) Inventors: Hiroki Uchiyama, Yokohama (JP); Katsuyuki Umezawa, Machida (JP); Seiichi Susaki, Yokohama (JP); Kenzi Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 11/520,645

(22) Filed: Sep. 14, 2006

(65) Prior Publication Data

US 2007/0057044 A1     Mar. 15, 2007

(30) Foreign Application Priority Data

Sep. 15, 2005    (JP)    ............................ 2005-268074

(51) Int. Cl.
*G06K 5/00*    (2006.01)
(52) U.S. Cl. ...................................... 235/380; 235/486
(58) Field of Classification Search ................ 235/380, 235/375, 381, 382, 382.5, 492, 493, 486, 235/487; 711/114, 116, 167; 709/203, 201, 709/227
See application file for complete search history.

(56) References Cited

U.S. PATENT DOCUMENTS

| | | | |
|---|---|---|---|
| 6,612,486 B2 * | 9/2003 | Sato et al. ................... | 235/375 |
| 6,742,120 B1 | 5/2004 | Markakis et al. | |
| 6,808,111 B2 * | 10/2004 | Kashef et al. .............. | 235/380 |
| 6,966,065 B1 * | 11/2005 | Kitazato et al. ............ | 725/116 |
| 6,986,458 B2 * | 1/2006 | Flugge et al. ............... | 235/375 |
| 7,003,571 B1 * | 2/2006 | Zombek et al. ............. | 709/227 |
| 7,123,608 B1 * | 10/2006 | Scott et al. .................. | 370/353 |
| 7,178,720 B1 * | 2/2007 | Strubbe et al. ............. | 235/375 |
| 7,280,979 B1 * | 10/2007 | Katz et al. .................... | 705/26 |
| 2001/0032232 A1 * | 10/2001 | Zombek et al. ............. | 709/201 |
| 2001/0037358 A1 * | 11/2001 | Clubb et al. ................ | 709/203 |
| 2002/0162047 A1 * | 10/2002 | Peters et al. ................... | 714/5 |
| 2003/0189739 A1 * | 10/2003 | Yamaguchi et al. ........ | 358/527 |
| 2003/0195653 A1 * | 10/2003 | Lewis et al. ................ | 700/236 |

FOREIGN PATENT DOCUMENTS

| | | |
|---|---|---|
| JP | 2002-073196 | 3/2002 |
| JP | 2003-216585 | 7/2003 |

OTHER PUBLICATIONS

Runtime Environment Specification, Sun Microsystems, Inc., Java Card™ Platform, Version 2.2.1, Oct. 2003.

* cited by examiner

*Primary Examiner*—Thien Minh Le
(74) *Attorney, Agent, or Firm*—Antonelli, Terry, Stout & Kraus, LLP.

(57) ABSTRACT

A Smart card-based service providing system and method, in which a service application uses resources of a common application and which can easily cope with an addition of a service application into the Smart card and thereby efficiently utilize valuable resources of the Smart card, is provided. A management application specially designed for access control is installed in the Smart card to solely manage access management information. A management of or a decision on an access right is not performed by the service application or the common application but by the management application. When a new application is added to the Smart card, the service provider device receives a permission to update access management information beforehand from the card issuer device and, based on the permission, updates the access management information.

9 Claims, 11 Drawing Sheets

A901 ACCESS MANAGEMENT TABLE

| | A902$_1$ SERVICE APPLICATION ID | ------ | A902$_n$ SERVICE APPLICATION ID |
|---|---|---|---|
| A903$_1$ COMMON APPLICATION ID | ACCESS RIGHT A904$_{11}$ | ------ | ACCESS RIGHT A904$_{1n}$ |
| ⋮ | | | |
| A903$_n$ COMMON APPLICATION ID | ACCESS RIGHT A904$_{n1}$ | ------ | ACCESS RIGHT A904$_{nn}$ |

FIG. 11

A1001 ACCESS RIGHT

| A1002 ACCESS TYPE | A1003 NUMBER OF ACCESS |
|---|---|

A1301 ACCESS MANAGEMENT TABLE UPDATE PERMIT

| PERMIT TYPE (A1302₁) | COMMON APPLICATION ID (A1303₁) | SERVICE APPLICATION ID (A1304₁) | ACCESS RIGHT (A1305₁) |
|---|---|---|---|
| ... | ... | ... | ... |
| PERMIT TYPE (A1302ₙ) | COMMON APPLICATION ID (A1303ₙ) | SERVICE APPLICATION ID (A1304ₙ) | ACCESS RIGHT (A1305ₙ) |
| CARD ISSUER'S SIGNATURE (A1306) | | | |

INFORMATION PROCESSOR-BASED SERVICE PROVIDING SYSTEM AND METHOD

INCORPORATION BY REFERENCE

This application claims priority based on a Japanese patent application, No. 2005-268074 filed on Sep. 15, 2005, the entire contents of which are incorporated herein by reference.

BACKGROUND OF THE INVENTION

The present invention relates to a system and method for providing services by an information processor and more particularly to an information processor-based service providing system and method which is suitably used on a method that shares resources such as IC cards or Smart cards and prevents illicit access to resources and which is capable of sharing resources among a plurality of applications.

Since IC cards and Smart cards (hereinafter referred to simply as "Smart card") have a limitation on their memory capacity, there is a growing demand for sharing the same resources (data and functions) among a plurality of applications (hereinafter referred to simply as "applications") to effectively utilize the limited resources.

In the case of Smart cards, however, the applications are isolated from one another by firewalls for security and therefore normally unable to share the resources.

To meet the above requirement, there has been known a technology to access shared resources beyond firewalls among applications (see, for example, Sun Microsystems Inc., "Runtime Environment Specification Java Card™ Platform, Version 2.2.1", [online], Internet <URL: http:/java-.sun.com/products/javacard/specs.html>). When one wishes to use these functions, a side that provides the shared resources (hereinafter referred to as a "common application") needs to authenticate a side that utilizes the shared resources (hereinafter referred to as a "service application") to prevent an access by an unauthorized service application.

The common application holds management information on the service application and, based on this information, authenticates the service application. Further, a technology is known which, even when a service application is newly added to the Smart card, can deal with this situation by updating the shared management information of the applications without replacing the common application itself (for example, see JP-A-2002-73196).

A method for efficiently referencing the resources within the Smart card from a plurality of applications is known. This method realizes its function by storing in the Smart card those applications that manage the resources within the Smart card (e.g., JP-A-2003-216585). A management application (management application 51) in JP-A-2003-216585 is designed to select an authenticating application that is run in the Smart Card.

Further, a technology is also available which determines whether the functions of the operating system in the Smart card can be used, by holding in the operating system an access flag for each application and referencing the access flag to limit the functions used by the associated application (e.g., U.S. Pat. No. 6,742,120).

SUMMARY OF THE INVENTION

In the conventional technologies, it is a precondition that the access control on the service applications is performed by common applications. When a service application is added to the Smart card, all the common applications that the added service application uses need to have the access management information added thereto. Further, since a plurality of common applications must hold the access management information and have an access right decision function, the limited resources in the Smart card have been wasted.

The present invention has been accomplished to solve the above problems and to provide a Smart card-based service providing system in which service applications are executed in the Smart card by using resources of the common applications and which can easily cope with an addition of a service application to the Smart card and allow for an effective use of valuable resources in the Smart card.

The Smart card-based service providing system according to this invention installs a management application program in the Smart card which is specially designed for access control (hereinafter referred to as a "management application") which solely manages access management information. The management of and decision on the access right are not performed by the common application but by the management application.

With this system, when a service application is added, what is needed is to only update the access management table held in the management application. Further, since the access management table and the access right decision function are concentrated in the management application, the valuable resources of the Smart card can be utilized efficiently.

More specifically, when it is desired to share the resources of the Smart card, the service application sends a resource share request to the common application, which in turn asks the management application whether it is permitted to provide the resources to the service application that has made the resource share request. The management application references the access management table, decides whether or not the service application in question has an access right to the common application and sends the decision result to the common application. The common application checks the received decision result for the access right and, if it is determined that the service application in question has the access right, sends an interface required to share the resources to the service application.

Further, when a new service application is added to the Smart card, the service provider device acquires a service permit from the common service provider device and, by using the service permit, receives an access management table update permit from the card issuer device in advance. The process of adding a new service application involves the service provider device sending the acquired access management table update permit to the management application in the Smart card upon request from the user terminal so that the management application can update the access management table. This procedure allows the system to easily cope with an addition of a new service application.

This invention therefore provides a Smart card-based service providing system which executes a service application by letting it use the resources of the common application in the Smart card and which can easily cope with an addition of a service application to the Smart card and thereby efficiently utilize the valuable resources in the Smart card.

These and other benefits are described throughout the present specification. A further understanding of the nature and advantages of the invention may be realized by reference to the remaining portions of the specification and the attached drawings.

DESCRIPTION OF THE EMBODIMENTS

One embodiment of the present invention will be described by referring to the accompanying drawings.

[Configuration of Smart Card-Based Service Providing System]

First, the configuration of a Smart card-based service providing system as one embodiment of this invention will be explained by referring to FIG. 1 to FIG. 4.

Figure 1:
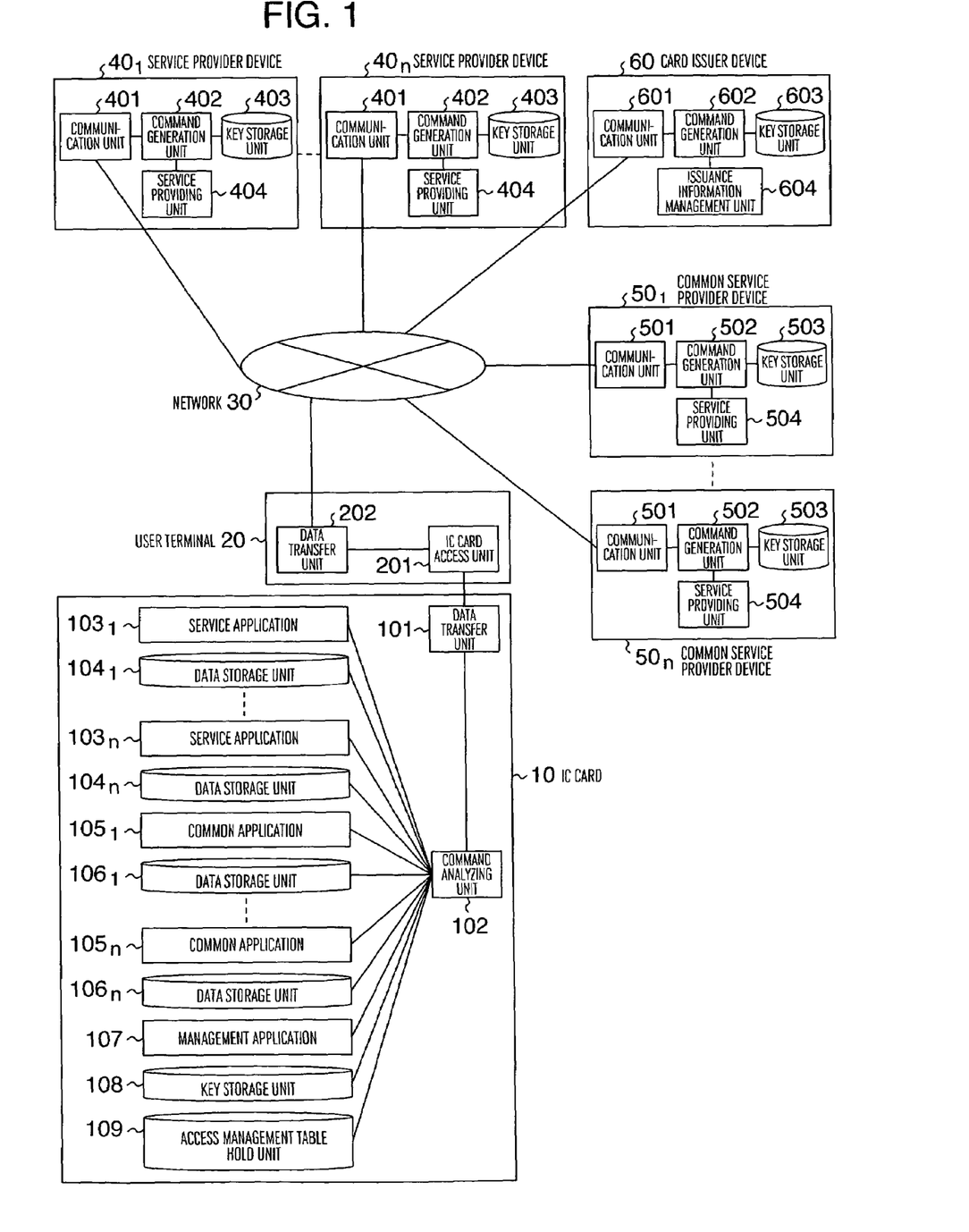
FIG. 1 illustrates a system configuration of a Smart card-based service providing system as one embodiment of this invention.

FIG. 1 is a system configuration diagram of the Smart card-based service providing system as one embodiment of this invention.

Figure 2:
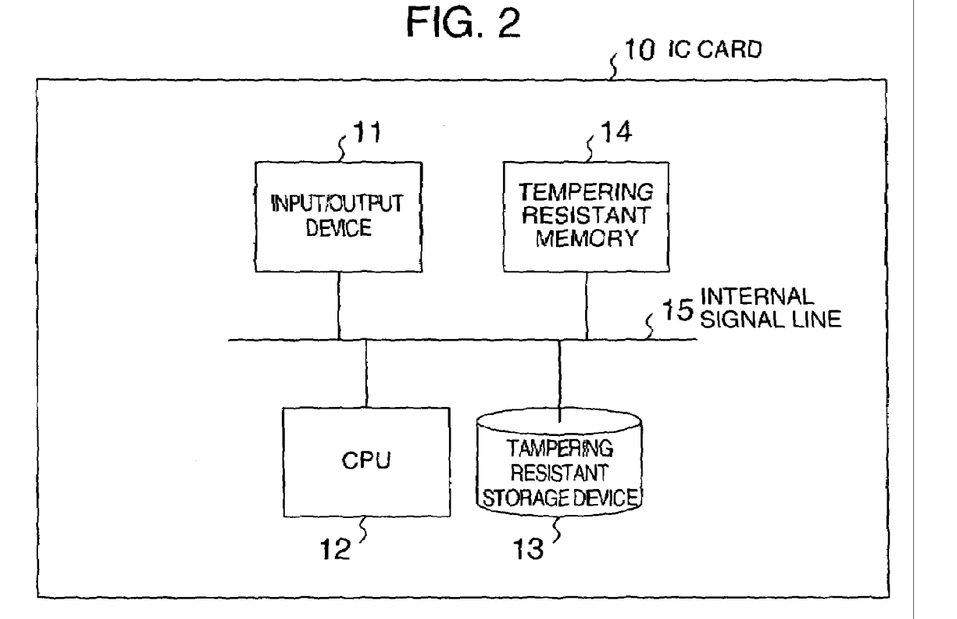
FIG. 2 illustrates a hardware configuration of a Smart card 10.

FIG. 2 is a hardware configuration diagram of a Smart card 10.

Figure 3:
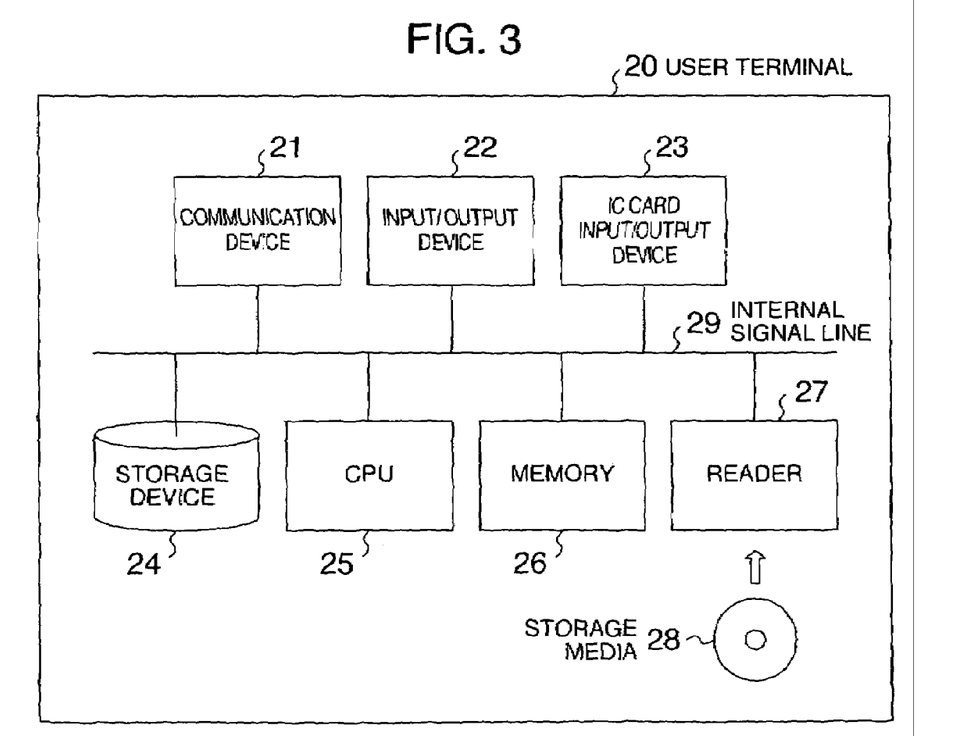
FIG. 3 illustrates a hardware configuration of a user terminal 20.

FIG. 3 is a hardware configuration diagram of a user terminal 20.

Figure 4:
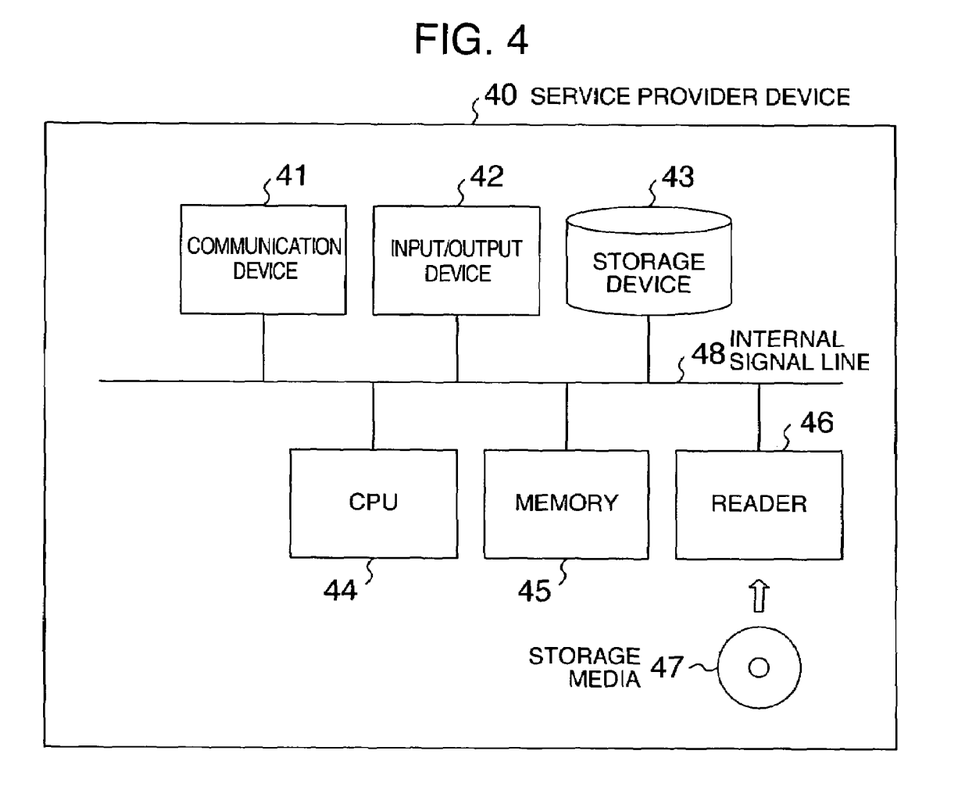
FIG. 4 illustrates a hardware configuration of a service provider device 40.

FIG. 4 is a hardware configuration diagram of a service provider device 40.

The Smart card-based service providing system, as shown in FIG. 1, comprises a Smart card 10, a user terminal 20 that accesses the Smart card, a service provider device 40 that accesses the Smart card 10 to provide services, a common service provider device 50 that offers the service provider device with common services, a card issuer device 60 that issues the Smart card 10, and a network 30 that interconnects them.

The Smart card 10 receives a command from outside, performs processing according to the content of the received command and then returns a result of the processing. The Smart card 10 comprises a data transfer unit 101, a command analyzing unit 102, service application units $103_1$-$103_n$ (also referred to simply as a "service application 103"), data storage unit $104_1$-$104_n$, common application units $105_1$-$105_n$ (also referred to simply as a "common application 105"), data storage units $106_1$-$106_n$, a management application 107, a key storage unit 108, and an access management table hold unit 109.

The data transfer unit 101 receives a command and returns a result of the processing. The command analyzing unit 102 perform analyzing the received command. The service application units $103_1$-$103_n$ perform processing according to the command. The data storage units $104_1$-$104_n$ store data used by the service application units $103_1$-$103_n$. The common application units $105_1$-$105_n$ provide the service applications with common services. The data storage units $106_1$-$106_n$ store data used by the common application units $105_1$-$105_n$. The management application 107 manages the rights of the service applications to access the resources of the common applications. The key storage unit 108 stores a key that the management application 107 uses in signing a digital signature and executing an encryption. The access management table hold unit 109 holds an access management table used by the management application to manage the service applications' accesses to the resources of the common applications.

The Smart card 10 can be installed with a variety of service applications, for example, credit card services, electronic money, administrative services, and applications using traffic organizations. Among the common applications there are a PIN (Personal Identification Number) authentication application, a data management application and so on that are commonly used by these service applications.

The user terminal 20 comprises a Smart card access unit 201 and a data transfer unit 202.

The Smart card access unit 201 sends and receives commands to and from the Smart card 10. The data transfer unit 202 transfers data to and from the network 30.

The service provider device 40 comprises a communication unit 401, a command generation unit 402, a key storage unit 403 and a service providing unit 404.

The communication unit 401 transfers data to and from the network 30. The command generation unit 402 generates a command to be sent to the Smart card 10. The key storage unit 403 stores a key used to generate the command. The service providing unit 404 provides the Smart card 10 with services.

The common service provider device 50 comprises a communication unit 501, a command generation unit 502, a key storage unit 503 and a service providing unit 504.

The communication unit 501 transfers data to and from the network 30. The command generation unit 502 generates a command to be sent to the Smart card 10. The key storage unit 503 stores a key used to generate the command. The service providing unit 504 provides the service provider device 40 with services.

The card issuer device 60 comprises a communication unit 601, a command generation unit 602, a key storage unit 603 and an issuance information management unit 604.

The communication unit 601 transfers data to and from the network 30. The command generation unit 602 generates a command to be sent to the Smart card 10. The key storage unit 603 stores a key used to generate the command. The issuance information management unit 604 holds and manages the Smart card 10 issuance information.

The hardware configuration of the Smart card 10, as shown in FIG. 2, comprises an input/output device 11, a CPU 12, a tampering resistant storage device 13, a tampering resistant memory 14 and an internal communication line 15 such as a bus to interconnect them. The Smart card is not limited to a card-like shape such as a telephone card but can take any arbitrary form, such as a memory card including MMC(Multi Media Card) and SD cards, as long as it includes the aforementioned constitutional elements. The tampering resistant memory 14 is a main memory device into which are loaded programs and data that are executed by the CPU 12. The tampering resistant storage device 13 is an auxiliary storage device holding data.

The hardware configuration of the user terminal 20, as shown in FIG. 3, comprises a communication device 21, an input/output device 22, a Smart card input/output device 23, a storage device 24, a CPU 25, a memory 26, a reader 27 and an internal communication line 29 such as a bus interconnecting them.

The hardware configuration of the service provider device 40, as shown in FIG. 4, comprises a communication device 41, an input/output device 42, a storage device 43, a CPU 44, a memory 45, a reader 46 and an internal communication line 48 such as a bus interconnecting them. The common service provider device 50 and the card issuer device 60 are also similar in configuration to the service provider device 40 shown in FIG. 4.

[Processing Performed by Smart Card-Based Service Providing System]

Next, by referring to FIG. 5 to FIG. 9, processing performed by the Smart card-based service providing system will be explained as one embodiment of this invention.

Figure 5:
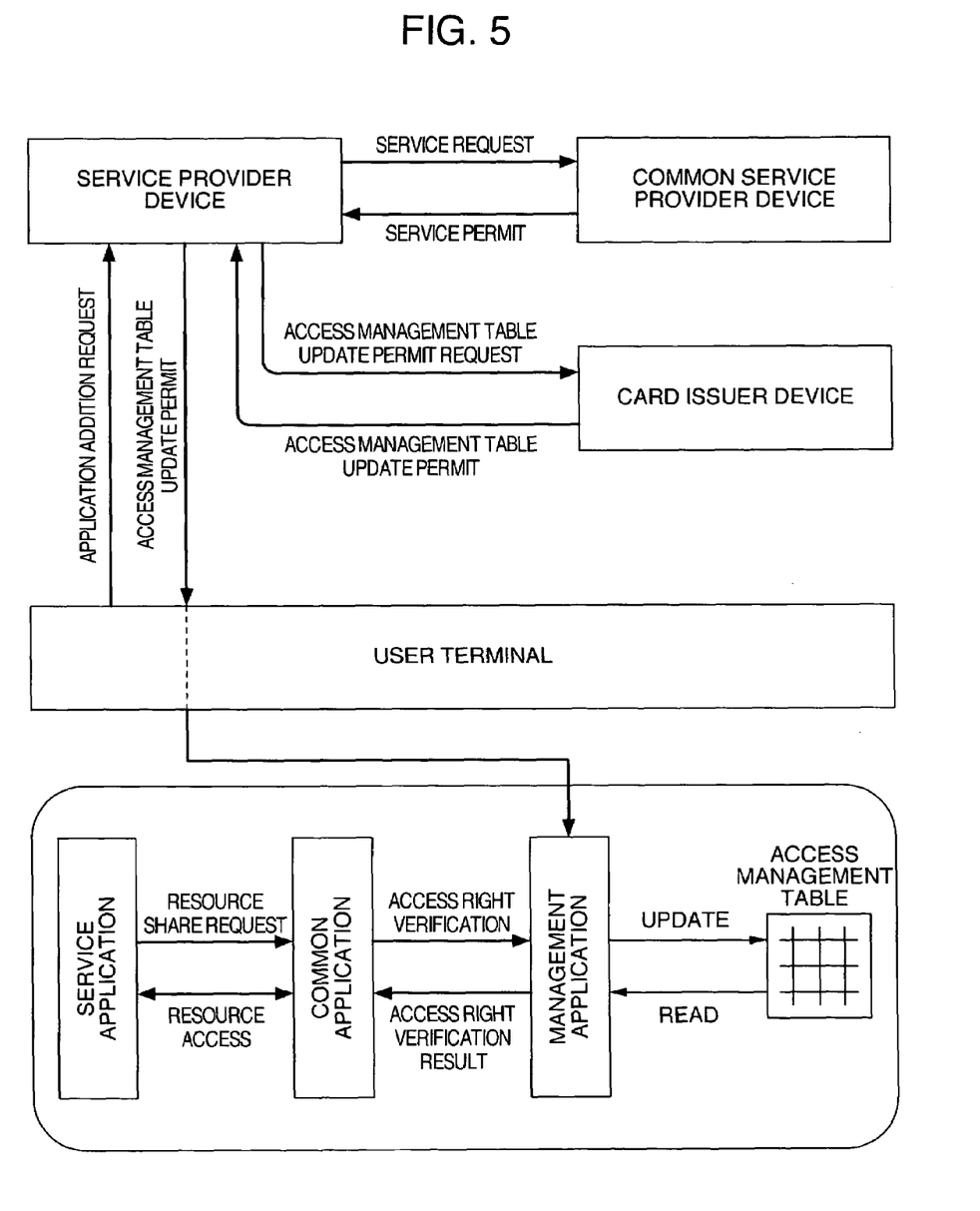
FIG. 5 illustrates an outline of processing performed by the Smart card-based service providing system as one embodiment of this invention.

FIG. 5 shows an outline of the processing performed by the Smart card-based service providing system according to one embodiment of this invention.

The processing in the system described below is performed by those devices constituting the Smart card-based resource sharing system and those processing units implemented on the Smart card by loading programs stored in the memory of each device into the main memory where they are executed by the CPU. Further, each program may be stored beforehand in the storage devices or downloaded as necessary through other storage media or communication media (networks or carrier waves propagating on the networks).

Figure 6:
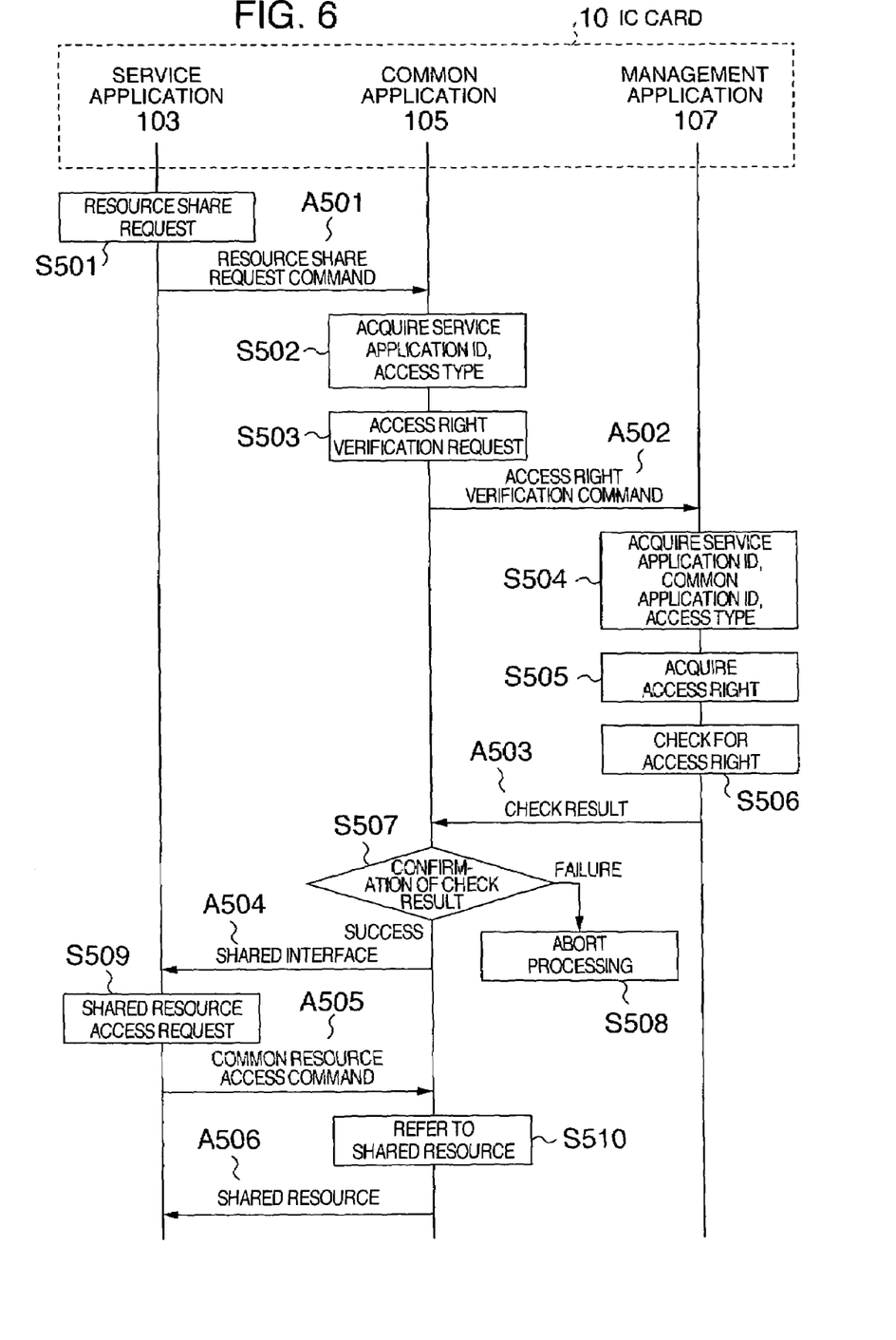
FIG. 6 is a flow chart showing a sequence of steps executed when a service application 103 uses the resources of the common application 105 in the Smart card 10.

First, let us explain about processing in which the resources of the common application 105 in the Smart card 10 are used by the service application 103.

FIG. 6 is a flow chart showing a sequence of steps performed when the resources of the common application 105 in the Smart card 10 are used by the service application 103.

When it wants to share the resources of the common application 105, the service application 103 executes a resource share request (S501). For this purpose, it sends a resource share request command A501 to the common application 105. Here, it is noted that the resource share request command A501 includes an ID and access type of the service application 103. The access type represents a category of an access to the resources, more specifically the reading, writing and execution on the resources.

Next, the common application 105 analyzes the received resource share request command and retrieves the ID and access type of the service application 103 (S502). Then, based on the retrieved ID and access type, the common application 105 executes an access right verification request (S503).

Then, the common application 105 sends an access right verification command A502 to the management application 107. Here it is noted that the access right verification command A502 includes an ID of the service application 103 and an ID and access type of the common application 105.

Next, the management application 107 analyzes the received access right verification command and retrieves an ID of the service application 103 and an ID and access type of the common application 105 (S504). By referring to the access management table held in the access management table hold unit 109, the management application 107 retrieves an access right of the service application 103 (S505). Although the detail of the access management table will be described later by referring to FIG. 10, the table holds an access right for each service application and common application. The access right includes an access type for reading only, for reading and writing and for execution and the number of accesses made.

Next, the management application 107 decides whether the service application 103 has a right to access the resources of the common application 105 according to the access type (S506) and then returns a result of decision A503 to the common application 105.

The common application 105 checks the decision result received (S507). If the check finds that the service application 103 does not have the right to access the common application 105, the processing is aborted (S508). If it is found that the service application 103 has the right to access the common application 105, the common application 105 sends a shared interface A504, through which to access the shared resources, to the service application 103. Here the shared interface means information that enables the service application 103 to use the shared resources, or access information such as particular addresses required for resource access.

Using the received shared interface, the service application 103 executes a shared resource access request (S509). That is, it sends a shared resource access command A505 to the common application 105.

Next, the common application 105 refers to the shared resources based on the received shared resource access command (S510) and then sends the shared resources A506 to the service application 103.

By following the above procedure, the service application 103 can access the resources of the common application 105.

Figure 7:
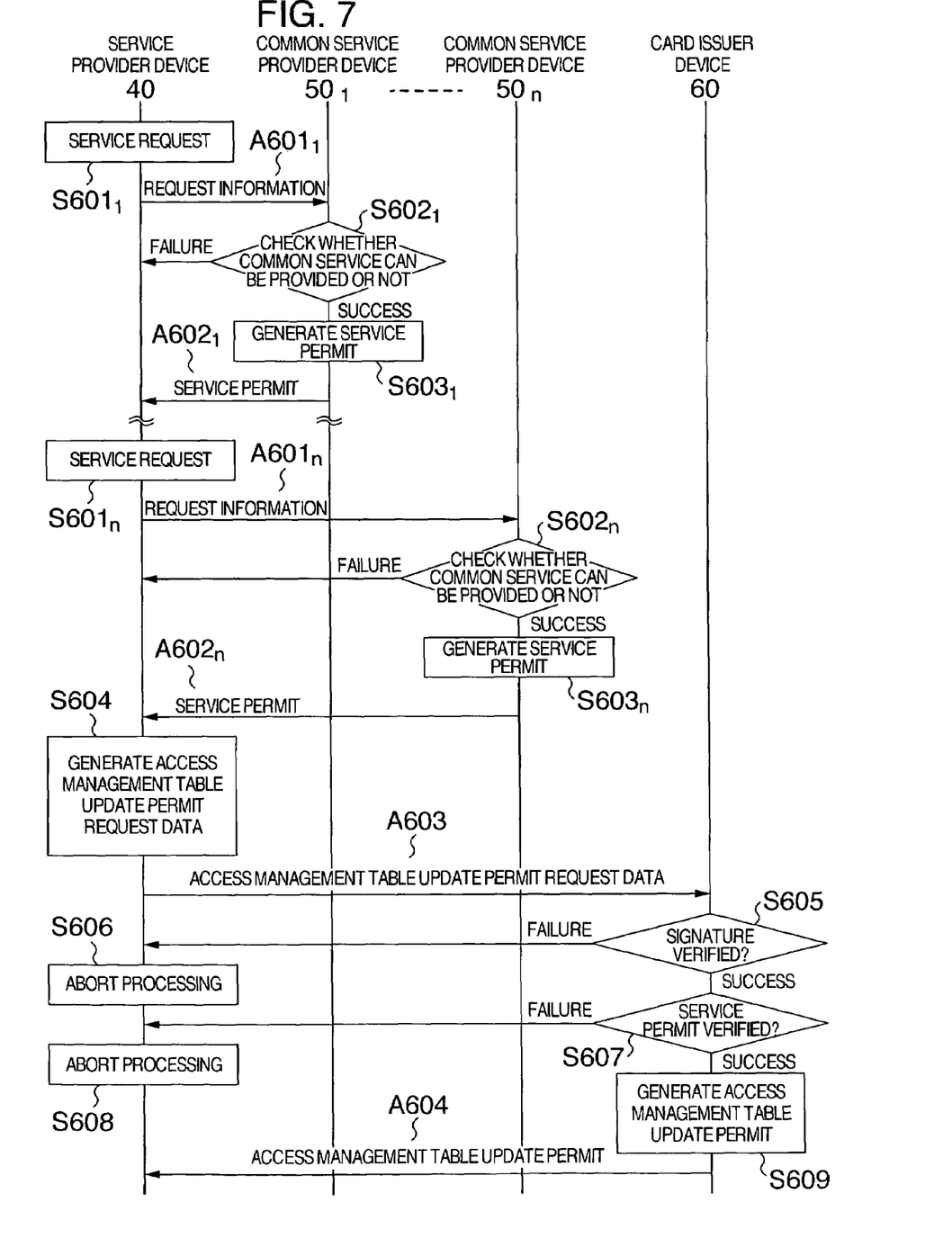
FIG. 7 is a flow chart showing a sequence of steps performed when the service provider device 40 acquires an access management table update permit to update an access management table 109.

Next, processing by which the service provider device 40 retrieves an access management table update permit necessary to update the access management table will be explained.

FIG. 7 is a flow chart showing a sequence of steps for the service provider device 40 to obtain an access management table update permit necessary to update the access management table.

First, the service provider device 40 sends request information A601$_1$ to the common service provider device 50$_1$ to execute the service request (S601$_1$). Here, the request information includes an ID of a newly added service application, an ID of the service provider device 40 and a type of permit (addition or deletion etc.).

Next, based on the received request information, the common service provider device 50$_1$ checks whether the common services can be provided to the service provider device 40 (S602$_1$).

Figure 12:
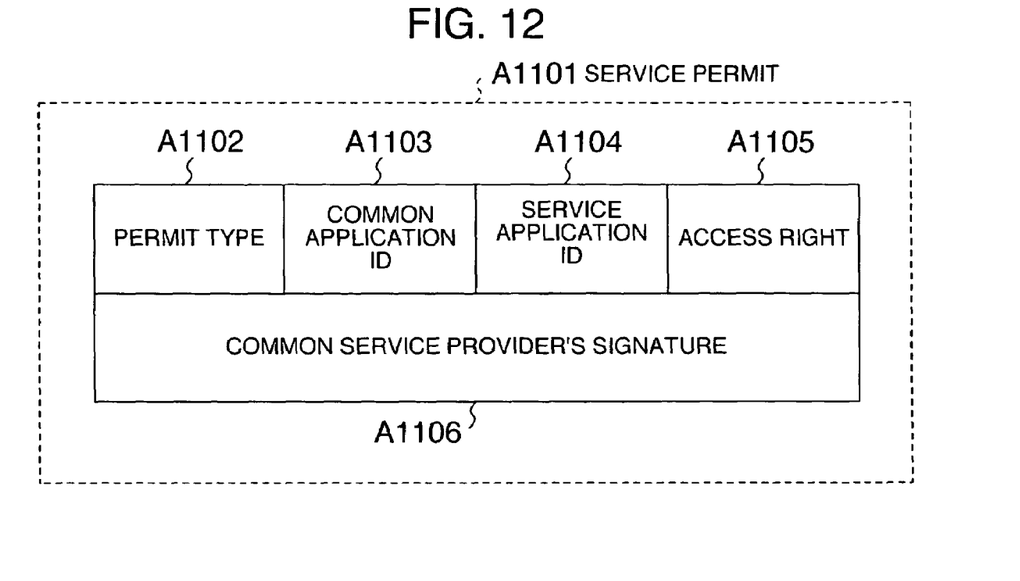
FIG. 12 illustrates a format of a service permit.

If it is decided that the common services are not allowed to be provided, the decision is notified to the service provider device 40. If the provision of the common services is found permitted, the common service provider device 50₁ generates a signature using a private key held in its key storage unit 503 and also a service permit (S603₁). The service permit, as shown in FIG. 12, contains data, such as a type of the permit, an ID of a newly added service application, an ID of the common application and an access right.

Next, the common service provider device 50₁ sends the generated service permit A602₁ to the service provider device 40.

The above procedure can be executed as many times as the service provider device 40 wants to receive the common services and these service permits A602₁-A602ₙ are held in the service provider device 40.

Figure 13:
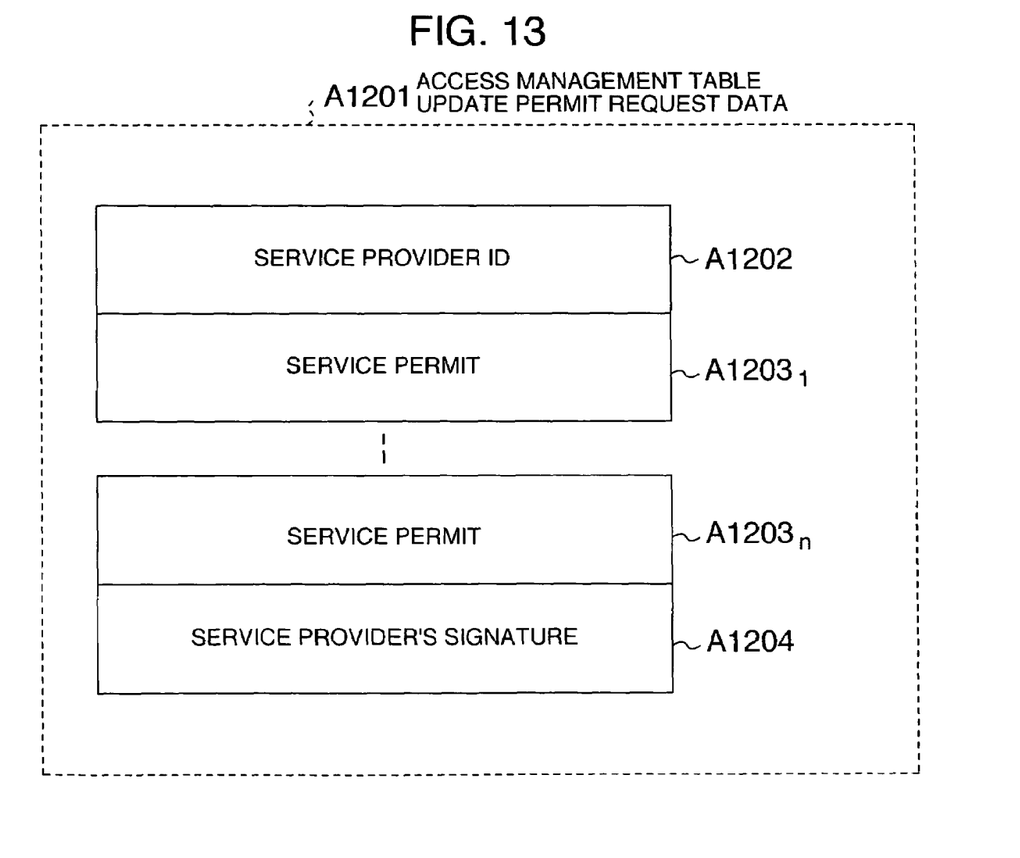
FIG. 13 illustrates a format of access management table update permit request data.

Next, to guarantee the legitimacy of the received service permit, the service provider device 40 creates a signature using a private key stored in the key storage unit 403 and then generates access management table update permit request data, such as shown in FIG. 13, (S604). Then, the service provider device 40 sends the generated access management table update permit request data A603 to the card issuer device 60.

The card issuer device 60 verifies the signature A1204 in the received access management table update permit request data with a public key or private key of the service provider device 40 stored in the key storage unit 603 (S605). If the verification finds that the signature is valid, the processing is allowed to continue. But if it is found that the signature is invalid, this is notified to the service provider device 40 and the processing is aborted (S606). Here, a public key encryption system or private key encryption system may be used for verifying the signature, and there are no restrictions on them.

Next, the card issuer device 60 verifies the signature A1105 of the service permit contained in the received access management table update permit request data with a public key or private key of the common service provider devices 50₁-50ₙ stored in the key storage unit 603 (S607). If the verification has found that the signature is valid, the processing is allowed to continue. If it is found that the signature is invalid, this is notified to the service provider device 40 and the processing is aborted (S608). Here, a public key encryption system or private key encryption system may be used for verifying the signature.

Next, the card issuer device 60 extracts from the service permit the permit type A1102, an ID of the common application A1103, an ID of the newly added application A1104 and an access right A1105 and creates a permit to update the access management table 109 (S609). (The structure of the service permit will be described later with reference to FIG. 12).

As a last step, the card issuer device 60 sends the generated access management table update permit A604 to the service provider device 40.

Next, processing to add a new service application to the Smart card 10 will be explained by referring to FIG. 8.

Figure 8:
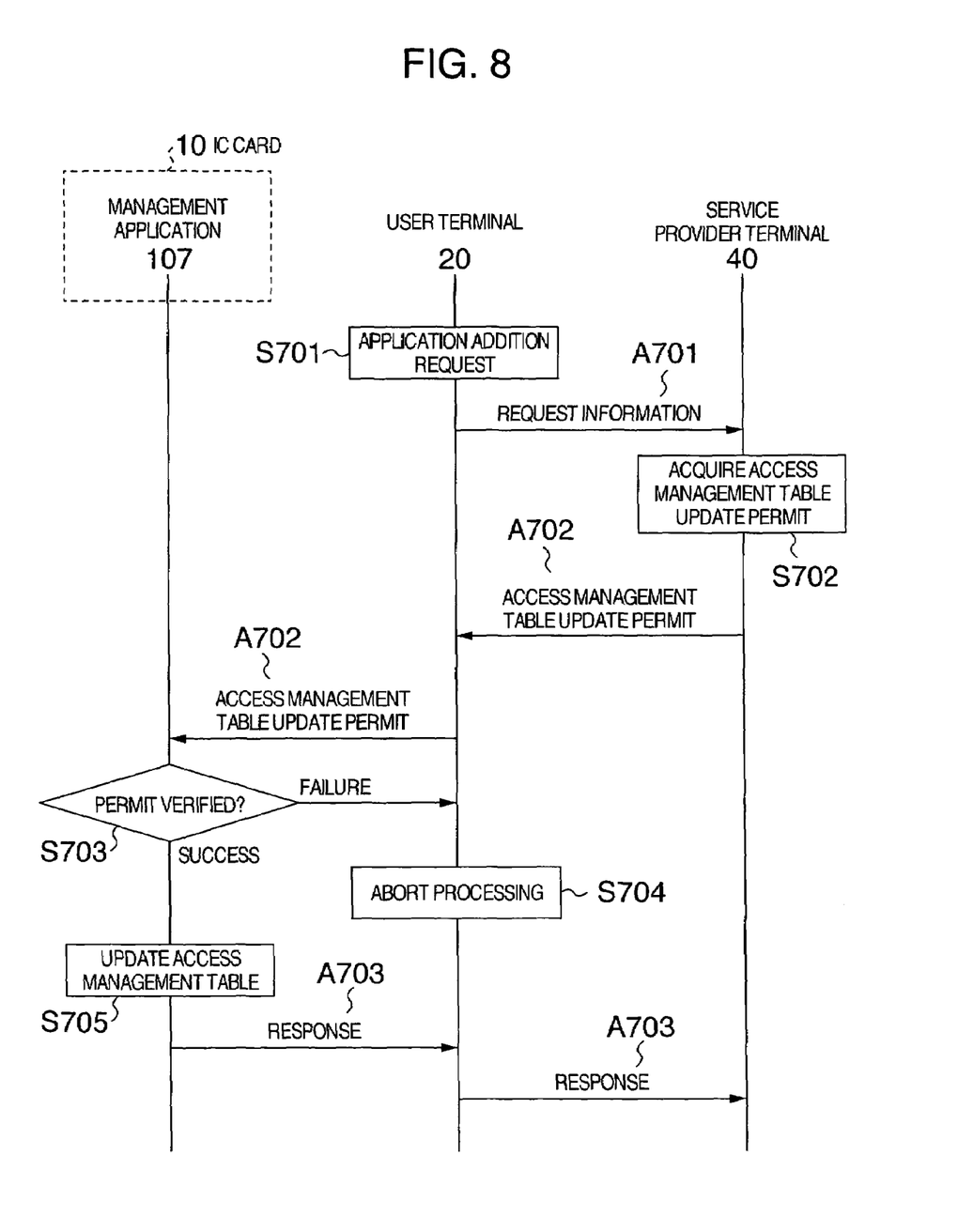
FIG. 8 is a flow chart showing a sequence of steps performed when a service application is newly added to the Smart card 10.

FIG. 8 is a flow chart showing a sequence of steps performed to add a new service application to the Smart card 10.

First, the user terminal 20, according to a request from the user or administrator of the Smart card 10, executes an application addition request (S701). For this purpose, the user terminal 20 sends request information A701 to the service provider device 40. Here, the request information includes an ID of the new service application to be added.

Next, the service provider device 40 picks up an ID of the newly added service application from the received request information and retrieves the access management table update permit (S702). The access management table update permit, as explained with reference to FIG. 7, has been acquired in advance by the service provider device 40 from the card issuer device 60.

Next, the service provider device 40 sends the retrieved access management table update permit A702 to the user terminal 20.

The user terminal 20 then sends the received access management table update permit to the management application, 107 in the Smart card 10.

Next, the management application 107 verifies the signature A1306 contained in the received access management table update permit with a public key or private key of the card issuer device 60 stored in the key storage unit 108 (S703). If it is found that the signature is invalid, this is notified to the user terminal 20 and the processing is aborted (S704). If the signature is found to be valid, the access management table 109 is updated according to the information contained in the access management table update permit (S705). Here, a public key encryption system or private key encryption system may be used for verifying the signature. The result of updating the access management table is transferred to the service provider device 40 via the user terminal 20 as a response A703.

Now, referring to FIG. 9, processing showing how the user terminal using the Smart card 10 containing the service application 103 is serviced by the service provider device 40 will be explained.

Figure 9:
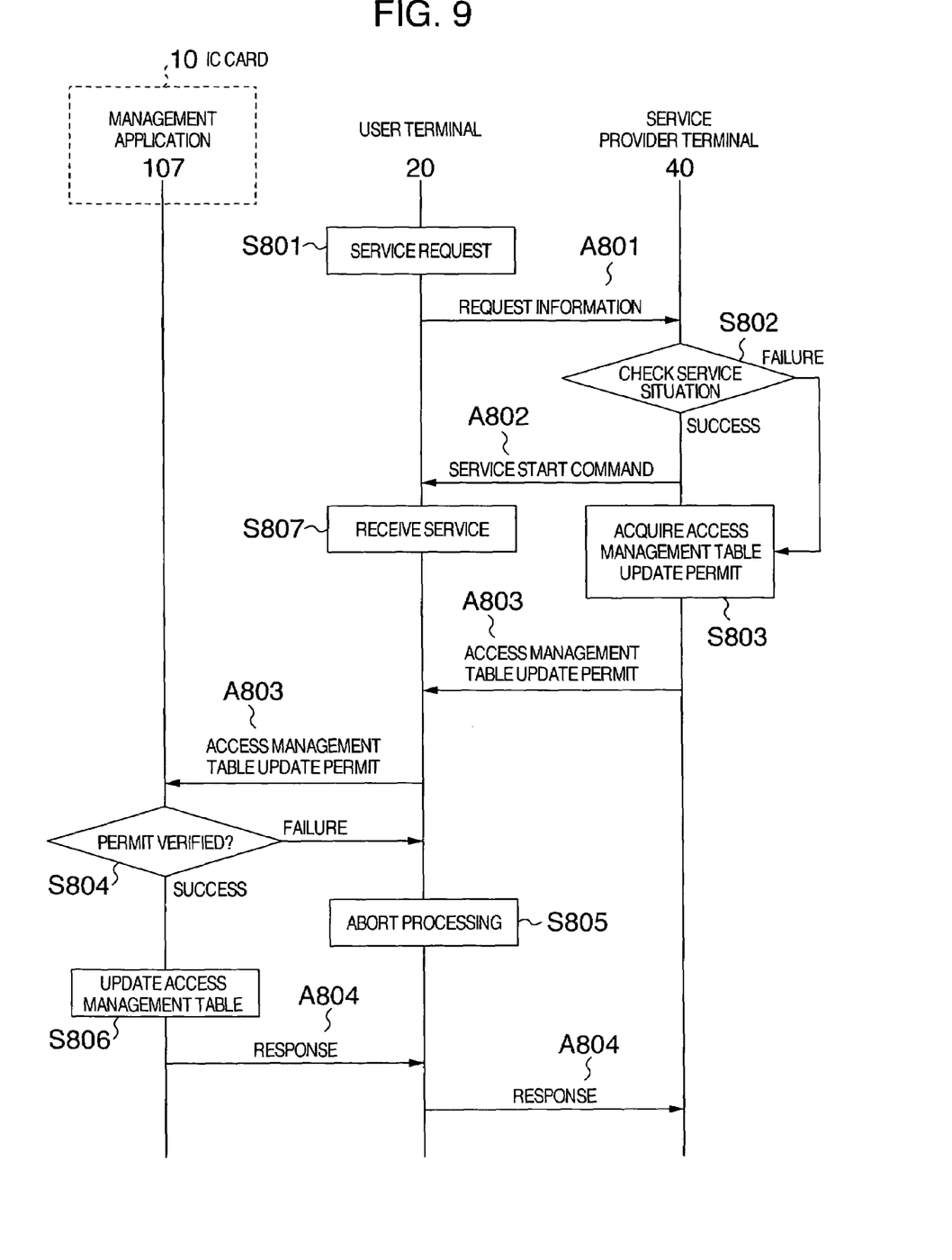
FIG. 9 is a flow chart showing a sequence of steps performed when a service application 103 is actually serviced by the service provider device 40 by using the Smart card 10 having the service application installed therein.

FIG. 9 is a flow chart showing a sequence of steps executed when the service provider device 40 actually services the user terminal using the Smart card 10 having the service application 103 installed therein.

First, the user terminal 20, based on a request from the user of the Smart card 10, executes a service request (S801). To this end, the user terminal 20 sends the request information A801 to the service provider device 40.

Next, the service provider device 40, based on the received request information, checks the current service situation (S802). If it is found that the service is continuing to be provided, the service provider device 40 sends a service start command A802 to the user terminal 20. As a result, the user now can receive services (S807).

If, on the other hand, it is found that the service has been stopped, in order to delete relevant record in the access management table hold unit 109, the service provider device 40 picks up an access management table update permit required to delete the record of the service application 103 in the Smart card 10 (S803). Next, it sends the picked up access management table update permit A803 to the user terminal 20.

Then, the user terminal 20 transfers the received access management table update permit to the management application 107 in the Smart card 10.

Then, the management application 107 verifies the signature in the received access management table update permit with a public key or private key of the card issuer device 60 stored in the key storage unit 108 (S804). If it is found that the signature is invalid, this is notified to the user terminal 20 and the processing is aborted (S805). If it is found that the signature is valid, the record of the service application 103 is deleted according to the information contained in the access management table update permit (S806). Here, a public key encryption system or private key encryption system may be used for verifying the signature.

Next, the management application 107 sends the result of updating the access management table to the user terminal 20 and the service provider device 40 as a response A804.

[Data Structure Used in Smart card-Based Service Providing System]

Next, a data structure used in the Smart card-based service providing system as one embodiment of this invention will be described by referring to FIG. 10 to FIG. 14.

Figure 10:
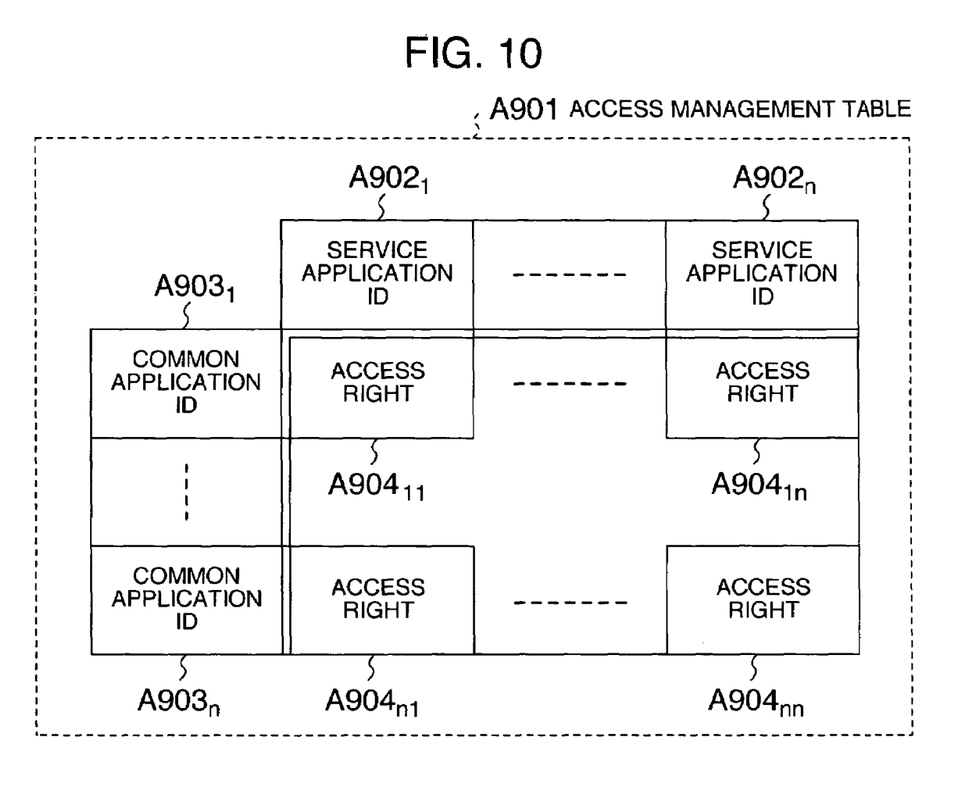
FIG. 10 illustrates a format of an access management table.

FIG. 10 shows a format of an access management table.

Figure 11:
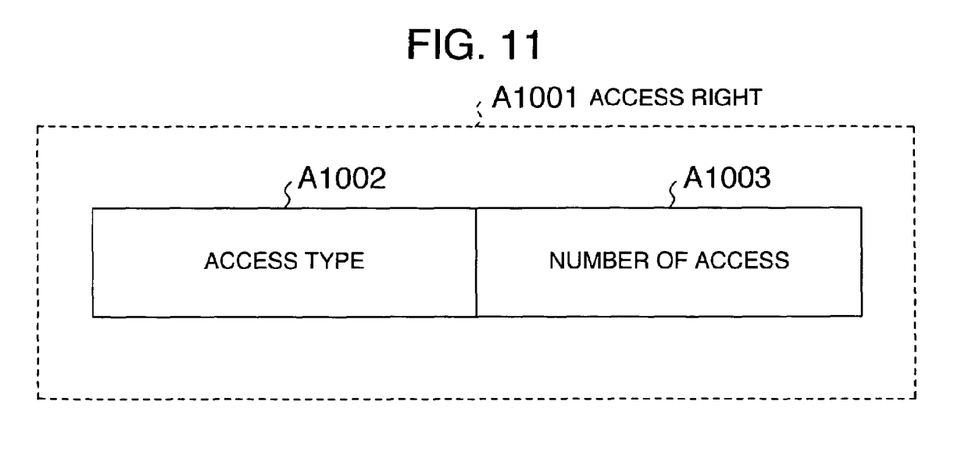
FIG. 11 illustrates a structure of an access right held in the access management table.

An access management table A901 is a table showing which service application 103 has what kind of access right to the common application 105 (see FIG. 11). If a service application $103_1$ and a service application $103_2$ have exactly the same access rights, it is possible to write into an item of access right of the service application $103_2$ data indicating that the service application $103_2$ has the similar access right to that of the service application $103_1$. With this method, the volume of data contained in the access management table can be reduced, making for an efficient use of limited device memories such as Smart card.

FIG. 11 shows a structure of an access right held in the access management table.

The access right A1001 comprises an access type A1002 and a number of access A1003. The access type represents an access category for resources which, for example, specifies reading, writing or execution operation on the resources. The number of access represents the number of accesses that the service application can make to the common application. An unlimited number of accesses may be specified.

FIG. 12 shows a format of a service permit.

A service permit A1101 is a permission that the common application gives to the service application to access the resources.

The service permit A1101 has a permit type A1102 located at its head, followed by an ID of the common application A1103 that provides common services, an ID of the service application A1104 that uses the common services and an access right A1105 held by the service application 103, in that order. Here, the permit type is data representing an addition, updating or deletion operation on the access management table. To guarantee that these data A1102-A1105 are valid, a digital signature is created using a private key of the common service provider device 50 held in its key storage unit 503 and then added as a common service provider signature A1106.

FIG. 13 shows a format of the access management table update permit request data.

The access management table update permit request data, as shown in FIG. 7, is a request that the service provider device 40 makes to the card issuer device 60 to issue an access management table update permit.

The access management table update permit request data A1201 has an ID of the service provider A1202, that requests the updating of the access management table, located at the head, followed by service permits $A1203_1$-$A1203_n$ that were retrieved in the steps $S603_1$-$S603_n$ in FIG. 7. To guarantee that these data A1202-A1203 are valid, a signature is created using a private key of the service provider held in the key storage unit 403 of the service provider device 40 and is added as a service provider's signature A1204.

Figure 14:
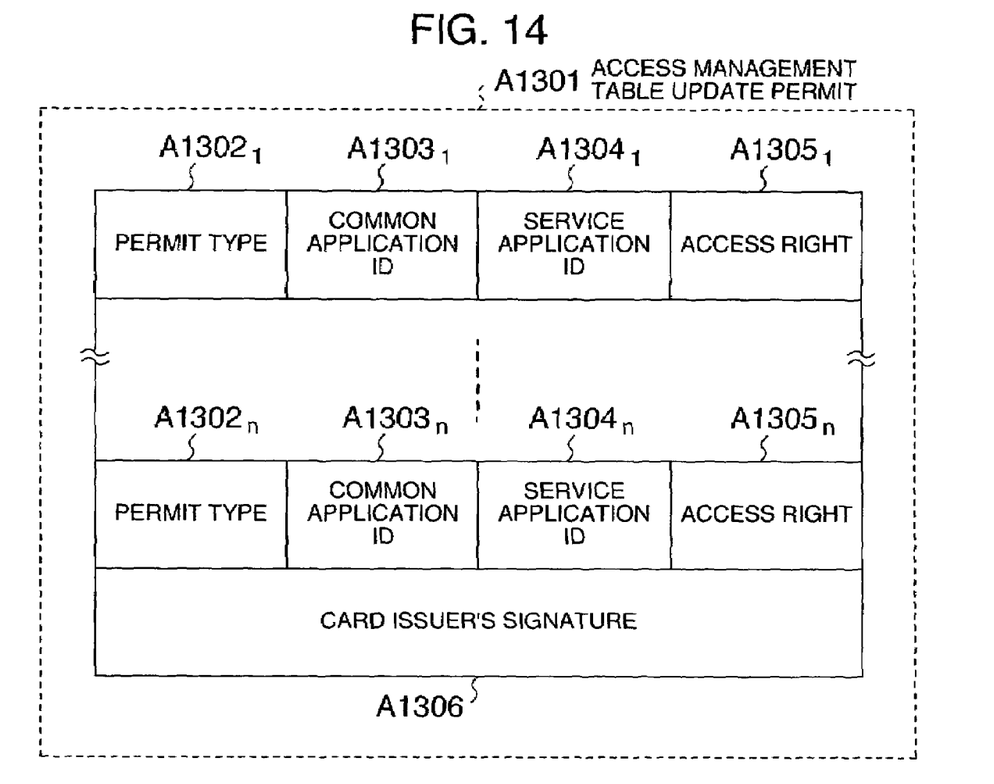
FIG. 14 illustrates a format of the access management table update permit.

FIG. 14 shows a format of the access management table update permit.

The access management table update permit allows the service application to update the access management table before it can access the resources of the common application.

The access management table update permit A1301 includes a permit type $A1302_1$-$A1302_n$ of the access management table update permit request data, a common application ID $A1303_1$-$A1303_n$, a service application ID $A1304_1$-$A1304_n$ and an access right $A1305_1$-$A1305_n$, followed by a signature that is created by using a private key of the card issuer held in the key storage unit 603 of the card issuer device 60. And the signature is added as the card issuer's signature A1306.

[Other Variations of Embodiment]

It is noted that the present invention is not limited to the above embodiments and that a variety of modifications may be made within the scope of the invention.

For example, the Smart card 10 may include the functions of the user terminal 20 so that the Smart card alone can connect to the network 30.

Even in such a case, there are no changes in the processing performed by the Smart card 10, service provider device 40, common service provider device 50 or card issuer device 60.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. An information processor-based service providing system, wherein the information processor has installed therein a service application and a common application shared by the service application, wherein the service application, when executed, uses resources of the common application to provide a service, the information processor-based service providing system comprising:
    a user terminal in which the information processor is inserted for use;
    a service provider device for giving a service start command upon receiving a service request from the user terminal;
    a common service provider device for giving a permit to provide a common service upon receiving a common service request from the service provider device;
    a card issuer device for managing a right to access the resources of the information processor; and
    a network for interconnecting the user terminal, the service provider device, the common service provider device and the card issuer device;
    wherein the information processor comprises:
    a data transfer unit for transferring a command;
    a command analyzing unit for analyzing the command;
    a service application unit for executing processing according to the command;
    a data storage unit for storing data used by the service application;
    a common application unit for executing the common application that provides resources to the service application;
    a data storage unit for storing data used by the common application;
    an access management table hold unit for holding an access management table containing information on the access right of the service application to the resources of the common application; and a management application unit for executing a management application, the management application being adapted to update the access management table and decide on the access right of the service application to the resources of the common application according to the access management table;

wherein the user terminal comprises:

an information processor access unit for accessing the information processor; and a data transfer unit for transferring data to and from the network;

wherein the service provider device comprises:

a communication unit for transferring data to and from the network;

a command generation unit for generating a command to be sent to the information processor; and a service providing unit for giving a service start instruction to the user terminal;

wherein the common service provider device comprises:

a communication unit for transferring data to and from the network;

a command generation unit for generating a command to be sent to the information processor; and a service providing unit for giving a permission to the service provider device to provide a common service;

wherein the card issuer device comprises:

a communication unit for transferring data to and from the network;

a command generation unit for generating a command to be sent to the information processor; and an issuance information management unit for holding issuance information on the information processor and giving a permission to update the access management table in the information processor.

2. An information processor-based service providing system according to claim 1, wherein the service provider device, the common service provider device, the card issuer device and the information processor each have a key storage unit and use data to which a digital signature is added in a data exchange via the network.

3. An information processor-based service providing system according to claim 1, wherein there are two or more of the common application units installed in the information processor.

4. An information processor-based service providing system according to claim 1, wherein the information processor further includes a data transfer unit for transferring data to and from the network.

5. An information processor-based service providing method, wherein the information processor has installed therein a service application, a common application shared by the service application and a management application to manage the use of resources of the common application according to an access management table, wherein the service application, when executed, uses the resources of the common application to provide a service;

the information processor-based service providing method comprising the steps of:

causing the service application to send an ID and an access type of the service application to the common application;

causing the common application to send an ID of the service application and an ID and an access type of the common application to the management application;

causing the management application to, based on the received information on the ID of the service application and the ID of the common application, reference the access management table, acquire an access right given to the service application and decide whether the access right matches the access type received; and causing the management application to send a result of the decision to the common application;

causing the common application to provide the service application with an interface for sharing the resources if it is determined from the received decision result that the service application has the access right; and causing the service application to access the resources of the common application by using the provided interface.

6. An information processor-based service providing method according to claim 5, wherein the access management table holds an access type such as reading, writing or execution and a number of access, both defined for each combination of the service application and the common application.

7. An information processor-based service providing method according to claim 5, further including the steps of:

causing the service provider device to make a service request and receive a service permit from the common service provider device; and causing the service provider device to, based on the service permit, make an access management table update request to the card issuer device and receive an access management table update permit.

8. An information processor-based service providing method according to claim 7, further including the steps of:

causing the service provider device to, when it receives an application addition request from the user terminal, send the access management table update permit to the user terminal;

causing the user terminal to transfer the access management table update permit to the management application in the information processor; and if it is found that the access management table update permit is valid, causing the management application to update the access management table.

9. An information processor-based service providing method according to claim 5, further including the steps of:

causing the service provider device to check a service situation when it receives a service request from the user terminal and, if it is found that the service is to have been stopped, send the access management table update permit to the user terminal;

causing the service provider device to send the access management table update permit to the management application; and if it is found that the access management table update permit is valid, causing the management application to delete an item associated with the service application from the access management table.

* * * * *